(12) United States Patent
Hansen et al.

(10) Patent No.: US 8,530,548 B2
(45) Date of Patent: Sep. 10, 2013

(54) FIBRE-REINFORCED THERMOPLASTIC MATERIAL

(75) Inventors: Morten Rise Hansen, Aalborg (DK); Ralf Ehmke, Meyenburg (DE)

(73) Assignee: Glatfelter Falkenhagen GmbH, Pritzwalk (DE)

( * ) Notice: Subject to any disclaimer, the term of this patent is extended or adjusted under 35 U.S.C. 154(b) by 16 days.

(21) Appl. No.: 12/224,975

(22) PCT Filed: Mar. 16, 2007

(86) PCT No.: PCT/EP2007/052536
§ 371 (c)(1),
(2), (4) Date: Mar. 13, 2009

(87) PCT Pub. No.: WO2007/107527
PCT Pub. Date: Sep. 27, 2007

(65) Prior Publication Data
US 2009/0306253 A1    Dec. 10, 2009

(30) Foreign Application Priority Data
Mar. 22, 2006   (DE) .......................... 10 2006 013 988

(51) Int. Cl.
*C08G 18/38* (2006.01)
*C08L 1/00* (2006.01)

(52) U.S. Cl.
USPC .......................................................... 524/35

(58) Field of Classification Search
USPC .......................................................... 524/35
See application file for complete search history.

(56) References Cited

U.S. PATENT DOCUMENTS

| | | | |
|---|---|---|---|
| 3,718,536 A * | 2/1973 | Downs et al. | 523/344 |
| 4,162,019 A * | 7/1979 | Joa | 414/412 |
| 4,305,507 A * | 12/1981 | Wittkopf | 209/3 |
| 4,308,187 A * | 12/1981 | Van Eenam | 524/521 |
| 4,425,126 A * | 1/1984 | Butterworth et al. | 604/366 |
| 4,494,278 A | 1/1985 | Kroyer et al. | |
| 4,640,810 A | 2/1987 | Laursen et al. | |
| 5,246,772 A * | 9/1993 | Manning | 442/364 |
| 5,292,075 A * | 3/1994 | Bartlett | 241/20 |
| 5,418,031 A * | 5/1995 | English | 428/74 |
| 5,527,171 A | 6/1996 | Soerensen | |
| 5,607,414 A * | 3/1997 | Richards et al. | 604/378 |
| 6,103,790 A * | 8/2000 | Cavaille et al. | 524/13 |
| 6,270,883 B1 * | 8/2001 | Sears et al. | 428/292.1 |
| 6,273,978 B1 * | 8/2001 | Tai | 156/62.8 |
| 6,458,299 B1 * | 10/2002 | Wierer et al. | 264/112 |
| 7,758,719 B2 * | 7/2010 | Gerber et al. | 162/4 |
| 2003/0003830 A1 * | 1/2003 | Ouederni et al. | 442/327 |
| 2004/0121693 A1 * | 6/2004 | Anderson et al. | 442/401 |
| 2005/0054253 A1 * | 3/2005 | Minoguchi et al. | 442/327 |
| 2005/0153615 A1 * | 7/2005 | Dutkiewicz et al. | 442/327 |
| 2007/0137811 A1 * | 6/2007 | Runge et al. | 162/109 |
| 2008/0295985 A1 * | 12/2008 | Moncla et al. | 162/157.6 |

FOREIGN PATENT DOCUMENTS

| | | |
|---|---|---|
| DE | 103 35 139 | 2/2005 |
| JP | 8108439 | 4/1996 |
| JP | 2000239455 | 9/2000 |
| JP | 2003025315 | 1/2003 |
| JP | 2003089958 | 3/2003 |
| JP | 2005144436 | 6/2005 |
| JP | 2005262559 | 9/2005 |
| JP | 2006241625 | 9/2006 |
| WO | WO 97/30838 | 8/1997 |
| WO | WO 02/083824 | 10/2002 |
| WO | WO 03/104309 | 12/2003 |
| WO | 2004063282 | 7/2004 |

OTHER PUBLICATIONS

Caulfield et al. Wood-fiber/polymer composites: Fundamental concepts, process, and material options, 1993, p. 128-134.*
English language description of DE 103 35 139 downloaded from EPO webiste.
English language abstract of corresponding document No. WO 2005/012399.

* cited by examiner

*Primary Examiner* — Liam Heincer

(57) ABSTRACT

The invention concerns a fiber-reinforced thermoplastic material containing airlaid cellulose fiber material, and uses thereof.

7 Claims, No Drawings

FIBRE-REINFORCED THERMOPLASTIC MATERIAL

The invention concerns a fibre-reinforced thermoplastic material and shaped parts which are or can be produced therefrom. The invention further concerns the use of airlaid cellulose fibre material for the production of such fibre-reinforced thermoplastic materials.

BACKGROUND OF THE INVENTION

Fibre-reinforced composite materials based on thermoplastic materials are being increasingly used in many areas of technology in place of metallic materials as they promise a substantial reduction in weight, with mechanical characteristics which are otherwise comparable in many respects. For that purpose, besides the thermoplastic matrix, the composite material includes a fibrous component which has a considerable influence on mechanical characteristics, in particular tensile and flexural strength as well as impact toughness of the composite material. Fibrous components used are (i) fibres of inorganic materials such as glass, carbon and boron, (ii) metallic fibres, for example of steel, aluminium and tungsten, (iii) synthetic organic fibres, for example of aromatic polyamides, polyvinyl alcohols, polyesters, polyacrylates and polyvinyl chloride, or (iv) fibres of natural origin, for example hemp and flax. Further additives and fillers can be added to the composite material.

In practice the use of glass fibre-reinforced thermoplastic materials is of particular significance in vehicle engineering, for example for vehicle interior cladding. It will be noted however that the production of glass fibres requires the use of considerable amounts of energy and the basic materials are not biological in origin so that the sustainability of the production process is open to criticism from ecological points of view. Furthermore, the disposal of glass fibre-reinforced thermoplastic materials is made difficult as even upon thermal decomposition of the material, considerable amounts of residues are left, which generally can only be taken to a disposal site. Finally glass fibres involve a high level of abrasiveness so that processing the materials in the context of usual processing methods for thermoplastic materials encounters difficulties.

Because of the above-mentioned disadvantages but also generally to improve the material properties therefore at the present time there is an intensive search for possible ways of replacing the glass fibres which dominate in many technical uses, as a reinforcing component. Organic fibrous materials of natural origin appear to be particularly attractive in this connection because of their lower density and the reduction in weight that this entails in the composite material as well as sustainability and easier disposal.

DE 103 35 139 A1 discloses a process for the production of a component comprising a fibrous composite material in which 3-10 mm long artificial recycled cellulose fibres are mixed as a fibre-reinforcing component with a thermoplastic material. The material obtained is used as a base material for the production of lightweight components.

WO 97/30838 A1 describes a fibre composite material of natural cellulose fibre material, in this case wood dust and a thermoplastic material. The material is extruded directly to produce the component.

It will be noted however that the use of natural fibrous materials as a fibre-reinforcing component is confronted with worse mechanical characteristics in the resulting composite materials, in comparison with fibre-reinforced composite materials with glass fibre constituents. Furthermore natural fibres such as flax, hemp or also wood particles are of a fluctuating composition: individual batches of the material differ depending on the respective cultivation area, cultivation period, storage and possibly preliminary treatment. That means however that the mechanical characteristics of the fibre-reinforced thermoplastic materials to be produced also vary, which makes technical use thereof more difficult. The material can further change in form and appearance by virtue of progressing degradation processes. Finally the natural sulphur and nitrogen content in the natural products can lead to outgassing of unwanted odorous substances.

WO 03/104309 A1 describes a fibre composite material to which cellulose fibres of pulp material are added, wherein the cellulose used is an α-cellulose with a degree of purity of >80%. The polymer matrix used is a polymer with a melting point of <200° C., for example a polypropylene. The composite material further includes at least one water-soluble binder, at least one lubricant and at least one bonding agent. The use of cellulose fibres has the advantage over natural fibres that the stiffness and impact toughness of the composite material obtained is increased, there is global availability of cellulose fibres and the consistency of the starting products and the composite material is increased.

The object of the present invention is to make use of the advantages linked to the use of organic materials of natural origin, but in so doing further to improve the processing-relevant and use-relevant properties of the composite material.

Solution According to the Invention

The object is attained by a fibre-reinforced thermoplastic material including:

a) an airlaid cellulose fibre material in b) a thermoplastic matrix.

In accordance with the invention accordingly the scatter material contains a cellulose fibre material in the form of an airlaid material as the fibre-reinforcing component. It has been found that the use of that fibre material leads to an increase in the impact toughness and the notch impact toughness as well as tensile and flexural strength in relation to the use of cellulose fibres of fibrous pulp which are not subjected to that processing operation but also in relation to thermoplastic materials mixed with wood dust. The reason for that behaviour is not yet completely clarified. It is assumed that the non-woven material production leads to a fibrous bond between individual cellulose fibres, which is at least partially maintained even in the subsequent operation of comminuting or processing the non-woven material.

An airlaid cellulose fibre material in the sense of the present invention is a material containing cellulose fibres, in particular produced from fibre pulp using the sulphate or sulphite process and scraps of a suitable airlaid non-woven material.

To produce the airlaid non-woven material fibre cellulose is mechanically separated up by means of hammer mills. The fibres are deposited by way of an air flow irregularly on a belt, forming a flat body (airlaid web forming). Subsequent binding of the fibres can be effected by glueing with aqueous dispersions (for example polyacrylates, polyvinyl acetates, ethylene vinyl acetates, styrene butadiene and other latices), by heat treatment of binder fibres or treatment with ultrasound or high frequency. The non-woven material density can be adjusted by controlled rolling pressure and the effect of temperature. Details regarding the airlaid process can be found inter alia in U.S. Pat. Nos. 4,494,278, 5,527,171 and 4,640,810, the content of which is here referred to in their entirety for the purposes of disclosure.

In a particularly preferred feature the fibre-reinforcing component used is a scatter material which is obtained by comminuting a non-woven material produced using the airlaid process, comprising lignin-free fibre pulp. Comminuting in the sense of the invention involves mechanically dividing the non-woven materials into small pieces. The processed airlaid non-woven materials, prior to the comminuting operation, are preferably of an average length-weighted fibre length in the range of 0.5 to 5 mm, particularly preferably 2 to 3 mm. The length-weighted fibre length is afforded as the quotient of the sum of all fibres multiplied with the associated squares of the length by the sum of all fibres multiplied with the associated lengths (measuring methods: ISO 16065-1 standard 2001-09; Fibre materials—determining the fibre length by automatic optical analysis—Part 1: Polarised light method). That fibre length detailing relates to the average length of the cellulose fibres, not the length of the comminuted airlaid cellulose fibre material. That length can no longer be clearly determined after passing through due to agglomeration, but is certainly greater than that of the cellulose fibres.

As the fibre constituents of the airlaid cellulose fibre material are essentially the important consideration, the further constituents are of generally subordinate significance for the purposes according to the invention. Particularly good impact toughness and notch impact toughness in comparison with thermoplastic materials mixed with wood dust (in particular polypropylene) are attainable with such fibre-reinforced thermoplastic materials according to the invention, in which the proportion of airlaid cellulose fibre material is at least 25% by weight with respect to the total amount of the fibre-reinforced thermoplastic material.

It is particularly conceivable that not just a comminuted airlaid non-woven material itself but also preferably residues from industrial production and processing of airlaid non-woven material are collected, comminuted and used in accordance with the invention. Residues from non-woven material production using the airlaid process or in the further steps of processing the material have hitherto been comminuted, pressed and dumped or incinerated. Incineration of the material however requires quality control of the incineration process so that it can be carried out only in special plants. Those disadvantages are eliminated with the use according to the invention of airlaid cellulose fibre material; in addition with that use it is possible to achieve the above-described advantages of the thermoplastic material according to the invention. Therefore the use of residues as a fibre-reinforcing component in thermoplastic composite materials is also particularly preferred.

Preferably, residues which occur in the production and processing of absorbent hygiene products which contain airlaid non-woven materials of lignin-free fibre pulp can also be used as the source for the comminuted airlaid non-woven materials. Absorbent hygiene products include in particular hygiene products for women and diapers.

Fibre pulp which is particularly preferred as the main constituent of the cellulose fibre material is a special product in industrial overall pulp production and can be obtained both by way of the acid sulphite process and also the alkaline sulphate (kraft) process. In that case the lignin proportion is reduced from previously typically 30% to 10%. The hemicellulose component is also attacked, but in the wide-spread sulphate process after treatment it is greater in comparison with the sulphite process at about 12%. Delignifying bleaching steps for increasing the degree of whiteness with oxygen (oxygen delignification), hydrogen peroxide brighteners (peroxide brightening) and ozone bleaches are also usual. Chlorine-oxygen compounds used for bleaching are scarcely still employed. The delignified fibre pulp is then converted into a transportable form by a wet paper deposit process, drainage, drying and rolling up or cutting plates. That fluffy fibre pulp which can be easily caused to fray (fluff pulp) can be readily subjected to further processing in the airlaid process.

Fibre pulp is the term used for the fine-fibrous material which predominantly consists of cellulose and which occurs when breaking down wood or other vegetable fibres. It is a refined natural product, it occurs in the form of a white fibrous solid material at ambient temperature and has a cellulose content of over 95%.

Fibre pulp is substantially free from lignin, in which respect lignin-free in accordance with the invention refers to a lignin content of $\leq 0.5\%$ by weight in relation to the total weight of the (dry) fibre pulp. Lignin can be determined as a hydrolysis residue, taking into account the ignition residue, by way of acid hydrolysis of the celulosic constituents. There is also an NIR (near infrared) spectroscopic method in which lignin-specific infrared-active bands are evaluated. The residual lignin content, ascertained in accordance with DIN 54356 and as a visible property by specifying the spectral reflection factor of brightness in pursuance of ISO 2469/ISO 2470, is usually over 75%, better over 85%. There is ISO 302 for ascertaining the degree of breakdown as the Kappa number (coupled to factor 0.15 gives lignin-%) for indirectly determining the oxidisable constituents, wherein lignin involves a substantial proportion, but can be falsified by hexenuronic acids. In that case therefore the Kappa number turns out to be too high in relation to actual lignin content.

The properties of the fibre pulp depend both on the kind of wood used and also the manufacturing process employed and are subject to fluctuations. Preferably airlaid cellulose fibre material with long-fibre soft wood-conifer fibre pulp is used as the fibre-reinforcing component of the thermoplastic materials as those fibres produced on the basis of for example pines have a higher level of tensile strength. As a substantial difference in relation to highly pure, generally hemicellulose-free chemical pulp the hemicellulose proportion in the case of fibre pulp is about 12%, with respect to the total weight of the (dry) fibre pulp. Chemical cellulose is used in the foodstuff, cosmetic and pharmaceutical industries and in the production of synthetic fibres from recycled cellulose such as viscose, cellulose acetate, lyocell, cellulose carbamate and the like.

Cellulose is the isotactic beta-1,4-polyacetal of cellobiose and forms unbranched, water-insoluble chains. The average molar masses are 50,000-500,000. The term alpha-cellulose is used to denote the component which is insoluble at 20° C. in 17.5% NaOH or 24% KOH, with an average degree of polymerisation >200; the proportion which can be precipitated from the sodium alkaline solution with methanol becomes beta-cellulose and the non-precipitatable component becomes gamma-cellulose, the last two together also being referred to as hemicellulose. The cellulose fibres have as their basis what is referred to as the elementary fibril which is visible with an electron microscope. A plurality of elementary fibrils form microfibrils and macrofibrils. That arrangement is to be found only in native cellulose fibres but not in artificial recycled cellulose fibres such as viscose. The most important raw material sources for cellulose are cotton and bast plants: flax, ramie, jute, hemp (at the moment still very small amounts) for the textile industry and wood for the paper and pulp industry. Preferably wood, in particular conifer wood, is used for the purposes according to the invention.

Thermoplastic materials is the term used to denote polymer materials which are soft or hard at the temperature of use and which have a flow transitional range above the temperature of use. Thermoplastic materials comprise straight or branched polymers which in principle are capable of flow in the case of amorphous thermoplastic materials above the glass transition temperature ($T_g$) and in the case of (partly) crystalline thermoplastic materials above the melting temperature ($T_m$). They can be processed in the softened condition by pressing, extruding, injection moulding or other shaping processes to afford shaped and moulded parts. Important thermoplastic materials are polyethylene, polypropylene, polystyrene, polyvinyl chloride, polyacryl nitrite, polyamides, polyesters and polyacrylates. It is also possible to use cuttings and chips of various thermoplastic polymers as the polymer matrix. The thermoplastic material does not have to be a homopolymer but can also be in the form of a copolymer, a polypolymer, a block polymer or a polymer modified in some other fashion.

Preferably the thermoplastic matrix is a polypropylene or contains a polypropylene as the main component in a blend, that is to say polypropylene has a proportion by weight of $\geq 50\%$ of the thermoplastic matrix. Composite materials on that polymer base—also in granulate form or in the form of a semi-manufactured material—can be easily processed and have advantageous mechanical characteristics, in particular for use in vehicle construction, for example for interior claddings.

Optionally, to enhance the tensile or flexural strength—in each case with the focus on the respective desired application—the adhesion between the polymer matrix and the fibre-reinforcing component is to be enhanced. For that purpose it is preferably possible to use a polypropylene which is modified to enhance the interaction with cellulose, in particular polypropylene maleic acid anhydride graft copolymer (MAPP). The modified polypropylene or another component for enhancing adhesion is added to the polymer matrix and/or the fibre-reinforcing component.

It is further preferable if the airlaid cellulose fibre material contains a binder for maintaining a bond between fibres of the airlaid cellulose fibre material, selected from the group consisting of (i) a fibrous or granulated thermoplastic material, preferably polyethylene and/or polypropylene and/or polyethylene terephthalate, (ii) fibres sheathed with a thermoplastic material, (iii) a latex, preferably a self-crosslinking or crosslinked EVA latex, a vinyl emulsion including emulsions based on vinyl acetate or other vinyl esters, in the form of homopolymers or copolymers with ethylene and/or acrylic monomers, acrylic emulsions in the form of homopolymers or copolymers or other crosslinked adhesives, and mixtures of two or more of said binders in accordance with (i) to (iii). Binders to be emphasised, beside latex, are what are referred to as two-component fibres having a core of polypropylene or polyethylene terephthalate and a sheathing of polyethylene. The polyethylene of the sheathing acts in that case as the actual binder between the two-component or bi-component fibres which retain their fibrous structure upon melting of the polyethylene by virtue of their core with a higher melting point, and are thus suitable for also holding the cellulose fibres.

Besides those two-component fibres, polyester-copolyester core-sheath fibres and multi-component fibres are also envisaged as binders. Polyester-copolyester core-sheath fibres are particularly suitable as copolyesters with a low melting point with similar temperature windows to polyethylene are also available. The binders usually make it possible for a bond to be maintained between the fibres of the cellulose fibre material even upon contact with fluid. The binders further promote the reinforcing action of the airlaid cellulose fibre material in the fibre-reinforced thermoplastic material, insofar as they improve the bond holding the fibre material together, in processing and in the finished thermoplastic material. That is advantageous in particular when using a scatter material comprising airlaid cellulose fibre material.

Embodiments which are desirable in accordance with the invention are also thermoplastic materials containing super-absorbent polymers (SAP). Super-absorbent polymers (SAP; also 'super slurper') are polymeric, gel-forming compounds which are capable of binding very large amounts of water without deliquescing in that case. Examples are the water-insoluble starch/acrylamide/acrylic acid graft copolymers produced by alkaline hydrolysis of starch/acrylonitrile copolymers or also crosslinked polyacrylic acids. It is possible to achieve a reduction in outgassing after processing of the granulate to give shaped or moulded parts.

In addition further additives and adjuvants can be contained in the thermoplastic material according to the invention. Adjuvants can be in particular fillers, stabilisers, anti-static agents, flame-proofing agents, colouring agents in the form of master batches as 1-3% with respect to the total granulate, flexibilisers and plasticisers, bonding agents, foaming agents, anti-bacterial agents and fungicides. Inorganic materials such as chalk, limestone, marble, aluminium, quartz, metal, mica and so forth can be considered as the filler.

Preferably the thermoplastic material is of the following composition:
  10-70 parts by weight of airlaid cellulose fibre material,
  30-90 parts by weight of thermoplastic matrix, and
  0.01-15 parts by weight of adjuvants and additives.

A thermoplastic material of the specified composition can be well processed, either to form a granulate, or a semi-manufactured product or in another form suitable for processing.

For production of the fibre-reinforced thermoplastic material the components are mixed together in per se known manner and optionally cut up into pieces. The thermoplastic material obtained by thermal or physico-thermal agglomeration of the components is preferably provided in the form of a granulate or semi-manufactured product for further processing. The thermoplastic material obtained, in the form of a granulate, is storable, can be well handled from the logistical point of view and is easy to use in further processing. Cellulose fibres consisting of fibre pulp are white so that the addition of colouring agents is substantially expanded, in comparison with natural fibres. Therefore a further aspect of the invention lies in the use of the fibre-reinforced thermoplastic material or the granulate/the semi-manufactured product on the basis of the thermoplastic material in vehicle construction, in particular for the production of component parts of the vehicle interior cladding such as side door covers, front region, rear parcel shelf and vehicle roof. Colour adjustment can be effected here by adding a master batch, typically 1-3 parts by weight. The fibre-reinforced thermoplastic material or the granulate or the semi-manufactured product based on the thermoplastic material is also particularly suitable for the production of casings and packaging materials, for example containers, in particular in vehicle construction.

The thermoplastic material according to the invention, including the preferred embodiments described here, is advantageously suitable for forming a shaped or moulded part, in particular for use in the automobile industry. The high notch impact toughness and impact toughness which can be achieved by the use of a thermoplastic material according to the invention are particularly advantageous in regard to such a shaped or moulded part, with at the same time a saving in material in terms of the cost-intensive thermoplastic matrix.

The invention is described in greater detail hereinafter by means of the examples which however do not limit the scope of protection of the invention. All details hereinafter relate to parts by weight unless otherwise stated.

EXAMPLE 1

Residues of Airlaid Non-woven Material Production/Processing

Residues which occur in the industrial production or processing of airlaid non-woven materials are comminuted in a shredder. The scatter material obtained is typically of the following composition:

(i) 70 parts by weight of cellulose fibres of fibre pulp of a fibre length of 2-3 mm.

(ii) 10 parts by weight of synthetic fibres (two-component fibres) comprising a polymer core material with a higher melting temperature and a second polymer component forming a sheath. The core is predominantly of polypropylene or polyethylene terephthalate and the core of a polymer derived from polyethylene. The fibre length is 3-18 mm.

(iii) 10 parts by weight of a super-absorbent polymer (SAP), more specifically a polyacrylate. Alternatively it is possible to use modified starch or other water-insoluble, gel-forming polysaccharides.

(iv) 8 parts by weight of latex.

(v) 2 parts by weight of polypropylene.

The residues are mixed in a ratio by weight of 1:1 with pellets of pure polypropylene and agglomerated by thermo-mechanical processing. Pelleting of the products produces a granulate.

EXAMPLE 2

Residues from Diaper Production

Residues from the processing and production of diapers are comminuted in a shredder. The scatter material obtained is of the following typical composition:

(i) 43 parts by weight of cellulose fibres of fibre pulp which originate from airlaid non-woven materials. The fibre length is 2-3 mm.

(ii) 27 parts by weight of a super-absorbent polymer (SAP), namely a polyacrylate. Alternatively it is possible to use modified starch or other water-insoluble, gel-forming polysaccharides.

(iii) 22 parts by weight of synthetic fibres (one-component or two-component fibres). The core is predominantly of polypropylene or polyethylene terephthalate and in the case of two-component fibres the sheath is of a polymer derived from polyethylene. The fibre length is 3-18 mm.

(iv) 3 parts by weight of adhesive.

(v) 1 part by weight of elastic components.

The residues are mixed in a ratio by weight of 1:1 with pellets of pure polypropylene and agglomerated by thermo-mechanical processing. Pelleting of the products produces a granulate.

Comparison of the Impact and Notch Impact Toughness of Thermoplastic Materials According to the Invention with Other Materials Polypropylene granulate (hereinafter 'PP', Borealis HK 060 AE) was mixed with wood dust (hereinafter 'wood') and airlaid cellulose fibre material respectively (hereinafter 'cell') in the ratios specified in Table 1 and processed by injection moulding to give 4 mm thick ISO standard bars:

TABLE 1

| Material | Quantitatively metered volume [cm$^3$] | Injection pressure [bar] |
|---|---|---|
| Polypropylene (PP) | 55 | 200 |
| PP/wood 90/10 | 60 | 600 |
| PP/wood 75/25 | 60 | 650 |
| PP/wood 60/40 | 60 | 700 |
| PP/wood 50/50 | 60 | 800 |
| PP/cell 90/10 | 60 | 600 |
| PP/cell 75/25 | 60 | 700 |
| PP/cell 60/40 | 60 | 750 |
| PP/cell 50/50 | 60 | 900 |

The tool temperature was 25° C., the screw peripheral speed was 10 m/min, the dynamic pressure was 10 bars, the injection speed was 60 cm$^3$/s and the residual cooling time was 20 s. The airlaid cellulose fibre material contained 70% by weight of fluff pulp cellulose, 100% by weight of synthetic fibres of polyethylene, polypropylene and/or polyethylene terephthalate, 8% by weight of latex, 10% by weight of super-absorbent polymer particles, with the balance being polypropylene carrier.

The ISO standard bars produced were investigated in respect of their impact toughness and notch impact toughness in accordance with DIN EN ISO 179/1eAU with a pendulum pinch impact unit at 23° C. (pendulum impact toughness without notch: 5 J non-reinforced [100% PP], 2 J reinforced [balance]; pendulum notch impact toughness with notch: 0.5 J). Table 2 shows the results.

TABLE 2

| Material | Impact toughness $a_{cU}$ (mean value), [kJ/m$^2$] | Notch impact toughness $a_{cN}$ (mean value), [kJ/m$^2$] |
|---|---|---|
| Polypropylene (PP) | 46.9 | 1.20 |
| PP/wood 90/10 | 12.9 | 1.22 |
| PP/wood 75/25 | 9.27 | 2.15 |
| PP/wood 60/40 | 6.91 | 2.70 |
| PP/wood 50/50 | 5.15 | 2.90 |
| PP/cell 90/10 | 18.1 | 1.25 |
| PP/cell 75/25 | 15.6 | 2.64 |
| PP/cell 60/40 | 16.3 | 3.77 |
| PP/cell 50/50 | 16.1 | 4.43 |

It will be seen that the fibre-reinforced thermoplastic materials according to the invention, in comparison with wood-reinforced thermoplastic materials and in comparison with pure polypropylene, in particular as from a proportion of 25% by weight of airlaid cellulose fibre material, have in part markedly better impact toughness values, that is to say they are higher and stable in spite of a fluctuating composition, and in particular greater notch impact toughness levels.

Comparison of the Outgassing Values of Thermoplastic Materials According to the Invention with Other Materials Outgassing investigations in respect of volatile constituents were carried out on the above-specified materials in accordance with DIN 75201-B by controlled heating. The samples (circular, 2 mm thick plates of a diameter of 80 mm) were previously dried for 14 days over phosphorus pentoxide. The constituents condense on a cooler film, whose difference in mass prior to and after measurement provides information about the deposited constituents, also referred to as fogging.

| Material | Condensable constituent G, [mg] |
|---|---|
| Polypropylene (PP) | 1.87 |
| PP/wood 90/10 | 1.35 |
| PP/wood 75/25 | 1.26 |
| PP/wood 60/40 | 1.15 |
| PP/wood 50/50 | 0.97 |
| PP/cell 90/10 | 1.48 |
| PP/cell 75/25 | 1.15 |
| PP/cell 60/40 | 0.86 |
| PP/cell 50/50 | 0.87 |

It will be seen that the fibre-reinforced thermoplastic materials according to the invention, in comparison with wood-reinforced thermoplastic materials and in comparison with pure polypropylene, in particular as from a proportion of 25% by weight of airlaid cellulose fibre material, have in part markedly better, that is to say lower, condensate values and thus comply with a substantial demand in the automobile industry for reduced condensation of volatile constituents on windows or the like.

The invention claimed is:

1. A shaped or moulded part which is produced by moulding a fibre-reinforced thermoplastic material including:
   a) a shredded airlaid cellulose fibre material in
   b) a thermoplastic matrix, characterised in that the airlaid cellulose fibre material contains fibres sheathed with a thermoplastic material as a binder for maintaining a bond between fibres of the airlaid cellulose fibre material, wherein the binder is in the form of bi-component fibres with a core of polypropylene or polyethylene terephthalate, with an outer layer made from polyethylene, in the form of multi-component fibres with a polymer with a low melting point or in the form of polyester-copolyester core-sheath fibres with a sheath made from copolyester, wherein the tensile and flexural strength of the part is greater than the tesile and flexural strength of a part reinforced by cellulose fibres of fibrous pulp which are not subjected to an airlaid process and also greater than the tensile and flexural strength of thermoplastic materials mixed with wood dust.

2. A shaped or moulded part which is produced by moulding a fibre-reinforced thermoplastic material according to claim 1 characterised in that the thermoplastic matrix is formed entirely or in a predominant part by polypropylene.

3. A shaped or moulded part which is produced by moulding a fibre-reinforced thermoplastic material according to claim 1 and further including super-absorbent polymers.

4. A shaped or moulded part which is produced by moulding a fibre-reinforced thermoplastic material according to claim 1 characterised in that the proportion of airlaid cellulose fibre material is at least 25% by weight with respect to the total amount of the fibre-reinforced thermoplastic material.

5. A shaped or moulded part which is produced by moulding a fibre-reinforced thermoplastic material according to claim 1 characterised in that the cellulose fibre material has a residual lignin content of at most 0.2% by weight.

6. A shaped or moulded part which is produced by moulding a fibre-reinforced thermoplastic material according to claim 1 characterised in that the length-weighted fibre length of the cellulose fibre material is 0.5 to 5 mm.

7. A shaped or moulded part which is produced by moulding a fibre-reinforced thermoplastic material according to claim 1 characterised in that the proportion of the thermoplastic matrix is 30 to 90% by weight with respect to the total amount of the fibre-reinforced thermoplastic material.

* * * * *